United States Patent
Takeda

(10) Patent No.: US 9,829,388 B2
(45) Date of Patent: Nov. 28, 2017

(54) TEMPERATURE SENSOR

(71) Applicant: Uchiya Thermostat Co., Ltd., Saitama (JP)

(72) Inventor: Hideaki Takeda, Misato (JP)

(73) Assignee: Uchiya Thermostat Co., Ltd., Saitama (JP)

( * ) Notice: Subject to any disclaimer, the term of this patent is extended or adjusted under 35 U.S.C. 154(b) by 288 days.

(21) Appl. No.: 14/437,661

(22) PCT Filed: Jul. 26, 2013

(86) PCT No.: PCT/JP2013/070338
§ 371 (c)(1),
(2) Date: Apr. 22, 2015

(87) PCT Pub. No.: WO2014/083888
PCT Pub. Date: Jun. 5, 2014

(65) Prior Publication Data
US 2015/0292954 A1    Oct. 15, 2015

(30) Foreign Application Priority Data

Nov. 30, 2012  (JP) ................................ 2012-262862

(51) Int. Cl.
*G01K 7/00* (2006.01)
*G01K 7/16* (2006.01)
(Continued)

(52) U.S. Cl.
CPC ................ *G01K 7/16* (2013.01); *G01K 1/08* (2013.01); *G01K 1/16* (2013.01); *G01K 5/68* (2013.01)

(58) Field of Classification Search
None
See application file for complete search history.

(56) References Cited

U.S. PATENT DOCUMENTS 9,601,293 B2 * 3/2017 Takeda ................... H01H 37/52
2010/0002747 A1 * 1/2010 Bosch ...................... G01K 7/01
374/170

(Continued)

FOREIGN PATENT DOCUMENTS

JP         53954 U    1/1993
JP        630740 U    4/1994
(Continued)

OTHER PUBLICATIONS

"International Application Serial No. PCT/JP2013/070338 dated Aug. 19, 2013", w/ English Translation, 5 pgs.

*Primary Examiner* — Erica Lin
(74) *Attorney, Agent, or Firm* — Schwegman Lundberg & Woessner, P.A.

(57) ABSTRACT

A temperature detection element of a temperature sensor is connected to a print wire and three print wires for an input and output of a print substrate, one end of a lead wire for a connection is connected and fixed with solder to an external circuit for connection electrodes of the print wire, and the other end is externally drawn out of a sealing member of a hardened resin. Within the housing, the entire bottom surface of the print substrate is supported by a lower fixed member, and an end, closer to an opening part of the housing, of the print substrate, is sandwiched and fixed by an upper fixed member and the lower fixed member. The housing is configured with the same material and size as the housing of the temperature control element, and the temperature detection element inside is placed at a position approximated to a placement of a thermal response element of the temperature control element. By using an adhesive having a different thermal conductivity, a thermal characteristic of the temperature sensor can be varied.

10 Claims, 7 Drawing Sheets

(51) Int. Cl.
*G01K 1/08* (2006.01)
*G01K 1/16* (2006.01)
*G01K 5/68* (2006.01)

(56) References Cited

U.S. PATENT DOCUMENTS

| | | | |
|---|---|---|---|
| 2011/0286492 A1* | 11/2011 | Auret | G01N 25/18 374/1 |
| 2012/0255697 A1* | 10/2012 | Ishihara | D21H 13/36 162/164.6 |

FOREIGN PATENT DOCUMENTS

| | | | | |
|---|---|---|---|---|
| JP | 10176958 A | | 6/1998 | |
| JP | 2000162052 A | * | 6/2000 | |
| JP | 2000162052 A | | 6/2000 | |
| JP | 2006066751 A | | 3/2006 | |

\* cited by examiner

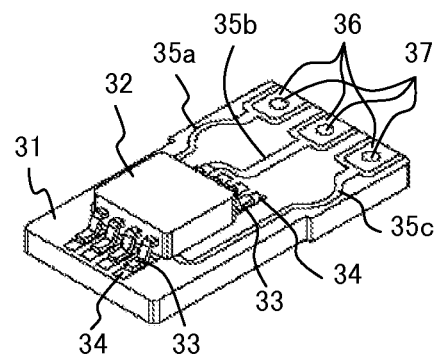
F I G. 3 A
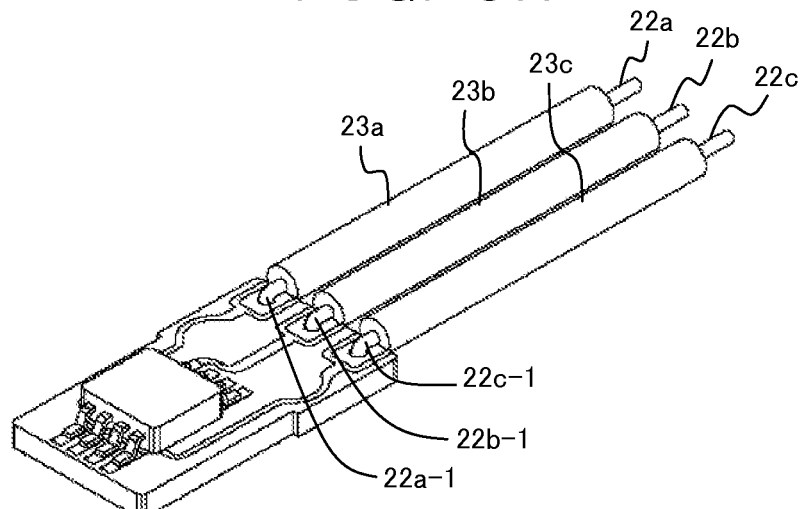
F I G. 3 B
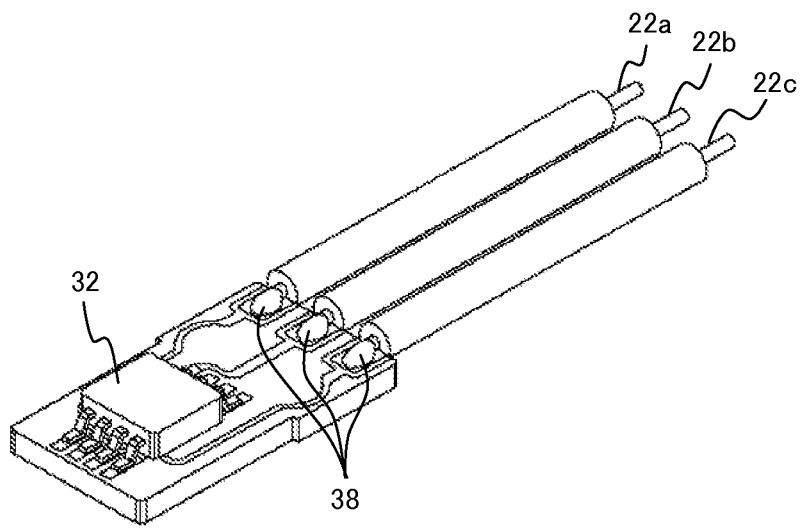
F I G. 3 C

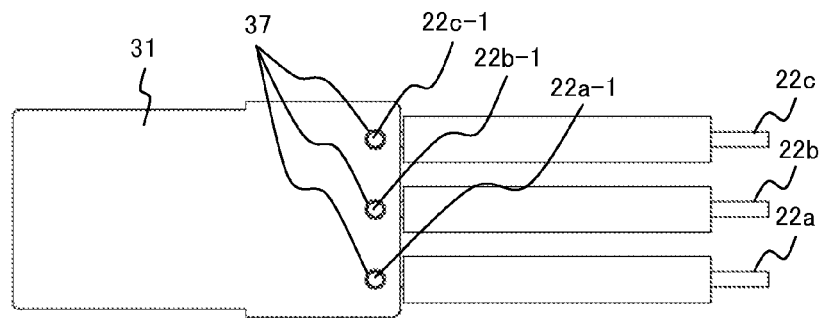
F I G. 4A
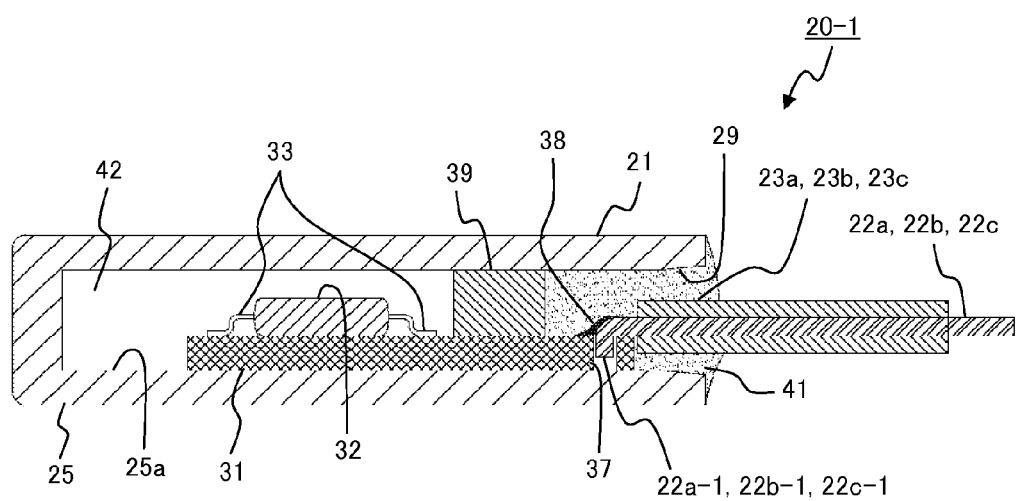
F I G. 4B

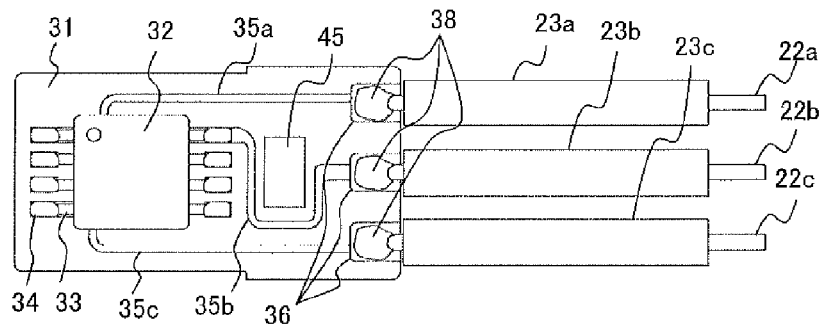
F I G. 6A
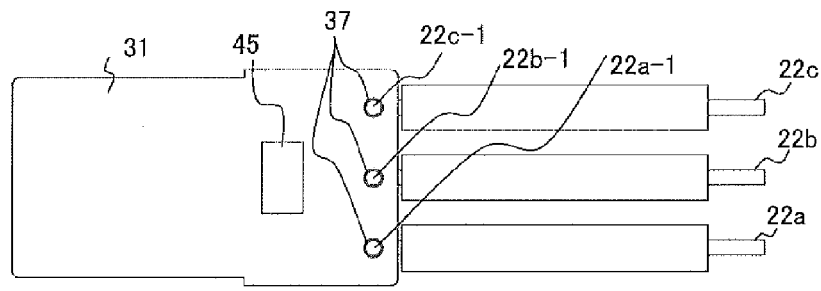
F I G. 6B
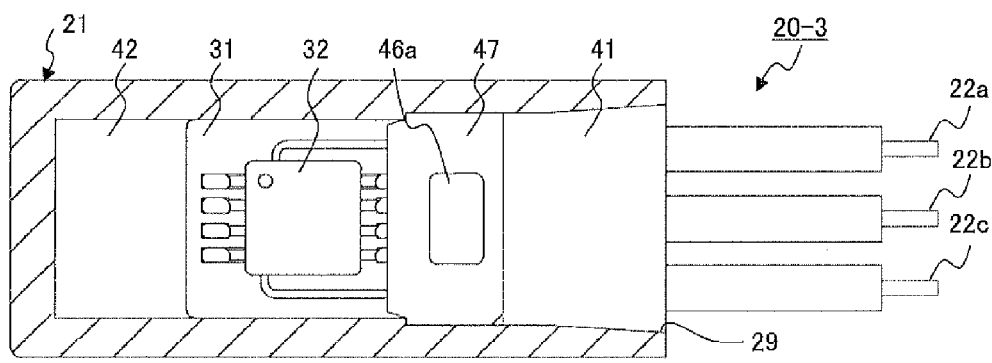
F I G. 6C
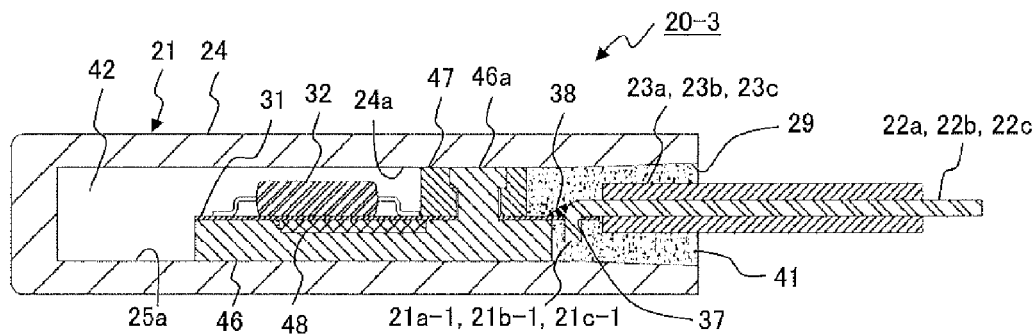
F I G. 6D

TEMPERATURE SENSOR

PRIORITY APPLICATIONS

This application is a U.S. National Stage application being filed under 35 U.S.C. §371 from International Application No. PCT/JP2013/070338, filed on 26 Jul. 2013, and published as WO/2014/083888 A1 on 13 Nov. 2013, the International Application claiming the benefit of priority under 35 U.S.C. §119 to Japanese Application No. 2012-262862, filed on 30 Nov. 2012; which applications and publication are incorporated herein by reference in their entirety.

TECHNICAL FIELD

The present invention relates to a temperature sensor, and more particularly, to a temperature sensor that accurately detects an operating temperature of a temperature control element such as a thermostat.

BACKGROUND ART

Conventionally, temperature sensors using a thermistor or a semiconductor are known. For example, in a temperature sensor the reliability is improved by forming an output terminal of a thermometer element mounted on a substrate with a conductive foil in order to prevent a resistance value from being changed by exfoliation caused by swelling or shrinkage at a joint between an electrode part and a wiring part of the thermometer element, and by connecting a core wire of an insulation-coated wire so that the wire can be stacked on the output terminal is proposed (for example, see Japanese Laid-open Patent Publication No. 2006-066751).

Additionally, as an example of a temperature sensor having a superior thermal response, a temperature sensor that is intended to measure a temperature of a fuser roller of a copier or the like and is structured by attaching a chip thermistor as a heat-sensitive element to tips of two plate springs so as to improve a following capability on a surface of the fuser roller, and by covering a portion including the chip thermistor with a cover sheet in close contact with the portion is proposed (for example, see Japanese Laid-open Patent Publication No. 2000-162052).

Furthermore, as a semiconductor temperature sensor that can accurately measure a temperature with a high sensitivity, a temperature sensor in which a piezo-resistance element is placed in an airtight space and the entire element makes close contact with a base portion even though a hollow portion is present in an upper portion of the piezo-resistance element, and which extracts a volume expansion and a distortion caused in a thin portion as electric signals and converts the extracted electric signals into temperature data is proposed (for example, see Japanese Laid-open Patent Publication No. HEI10-176958).

Incidentally, normal temperature sensors are manufactured by minimizing a thermal capacity of the temperature sensors themselves so as to accurately measure a temperature. However, when a temperature control element intended to control a temperature is incorporated, for example, in an electric appliance, thermal responses of both the temperature control element and a temperature sensor differ due to a difference between thermal capacities or the like of the temperature control sensor and the temperature sensor. This poses a problem to be solved, such that an operating temperature cannot be accurately set for the temperature control element by using the temperature sensor.

DISCLOSURE OF INVENTION

The present invention solves the above described conventional problem, and an object of the present invention is to provide a temperature sensor that accurately detects an operating temperature of a temperature control element.

A first temperature sensor according to the present invention includes: a temperature detection element for converting an ambient temperature into an electric temperature information signal; a housing, made of a metal or a resin, having a small side surface that forms one of remaining opposed small-area surfaces of a cuboid formed with opposed wide-area upper and lower surfaces and right and left opposed small-area side surfaces, and an opening part present in a portion opposed to the small side surface; a print substrate in which the temperature detection element is connected to print wires, a plurality of input and output terminals of the temperature detection element are respectively connected to input and output print wires, and connection electrodes are respectively formed at ends of the input and output print wires, within the housing; lead wires in which one end is connected to the connection electrodes and the other end is drawn out of the housing; a fixed member for fixing a side of an end closer to the opening part of the print substrate to the wide-area lower surface of the housing by pressing from above the side of the end; a hardened resin with which a space from the opening part to the fixed member is filled, for sealing a connection part with the connection electrodes of the lead wires connected to the connection electrodes, and lead wire covered parts on the side of the connection part; and a space part formed between five surrounding surfaces not including a surface connected to the print substrate of the temperature detection element and an inner surface of the housing. In the temperature sensor, the print substrate is placed so that the entire lower surface, which is a side surface opposite to an upper surface to which the temperature detection element is connected, can make close contact with the wide-area lower surface of the housing.

In this temperature sensor, for example, a penetration hole of a specified size for a vertical penetration is formed in a position corresponding to the center of the temperature detection element, and the penetration hole between a lower surface of the temperature detection element and a bottom surface of the housing is filled with an adhesive having a specified thermal conductivity, in the print substrate.

A second temperature sensor according to the present invention includes: a temperature detection element for converting an ambient temperature into an electric temperature information signal; a housing, made of a metal or a resin, having a small side surface that forms one of remaining opposed small-area surfaces of a cuboid formed with opposed wide-area upper and lower surfaces and right and left opposed small-area side surfaces, and an opening part present in a portion opposed to the small side surface; a print substrate in which the temperature detection element is connected to print wires, a plurality of input and output terminals of the temperature detection element are respectively connected to input and output print wires, connection electrodes are respectively formed at ends of the input and output print wires, and a penetration hole is formed between the connection electrodes and the temperature detection element, within the housing; lead wires in which one end is connected to the connection electrodes and the other end is drawn out of the housing; a lower fixed member, provided with a column that penetrates into the penetration hole of the print substrate, for aligning the print substrate with the column, and for supporting a lower surface, which is a side surface opposite to an upper surface to which the temperature detection element of the print substrate is connected; an adhesive that has a specified area and thickness and is interposed between the lower fixed member and a surface supported by the lower fixed member of the print substrate; an upper fixed member, externally fit into the column, for fixing, along with the lower fixed member, the print substrate by pressing from above the side of an end closer to the opening part of the print substrate; a hardened resin with which a space from the opening part to the upper fixed member and the lower fixed member is filled, for sealing a connection part with the connection electrodes of the lead wires connected to the connection electrodes, and lead wire covered parts on the side of the connection part; and a space part formed between five surrounding surfaces not including a surface connected to the print substrate of the temperature detection element and an inner surface of the housing. In the temperature sensor, the lower fixed member is placed so that the entire lower surface, which is a side surface opposite to an upper surface that supports the print substrate, can make close contact with the wide-area lower surface of the housing.

In this temperature sensor, a penetration hole of a specified size for a vertical penetration is formed in a position corresponding to the center of the temperature detection element, and the penetration hole is piled up and filled with a portion of the adhesive corresponding to the penetration hole, in the print substrate.

As described above, the present invention can provide a temperature sensor that accurately detects an operating temperature of a temperature control element such as a thermostat.

BRIEF DESCRIPTION OF DRAWINGS

FIG. 3A is a perspective view of the internal configuration accommodated within the housing of the temperature sensor according to the first and second embodiments in an order of assembly;

FIG. 3B is a perspective view of the internal configuration accommodated within the housing of the temperature sensor according to the first and second embodiments in the order of assembly;

FIG. 3C is a perspective view of the internal configuration accommodated within the housing of the temperature sensor according to the first and second embodiments in the order of assembly;

FIG. 4A illustrates the internal configuration of the temperature sensor according to the first embodiment when viewed from a back side;

FIG. 4B is a side-sectional view of a finished piece in which the internal configuration illustrated in FIG. 4A is accommodated within the housing;

FIG. 6A is a top view of the internal configuration of the temperature sensor according to the third embodiment;

FIG. 6B illustrates the internal configuration illustrated in FIG. 6A when viewed from a back side;

FIG. 6C is a top view of an inside implemented by removing a top surface of the housing after the internal configuration illustrated in FIGS. 6A and 6B is accommodated within the housing;

FIG. 6D is a side-sectional view of a finished piece in which the top surface is attached to the configuration illustrated in FIG. 6C;

Figure 1A:
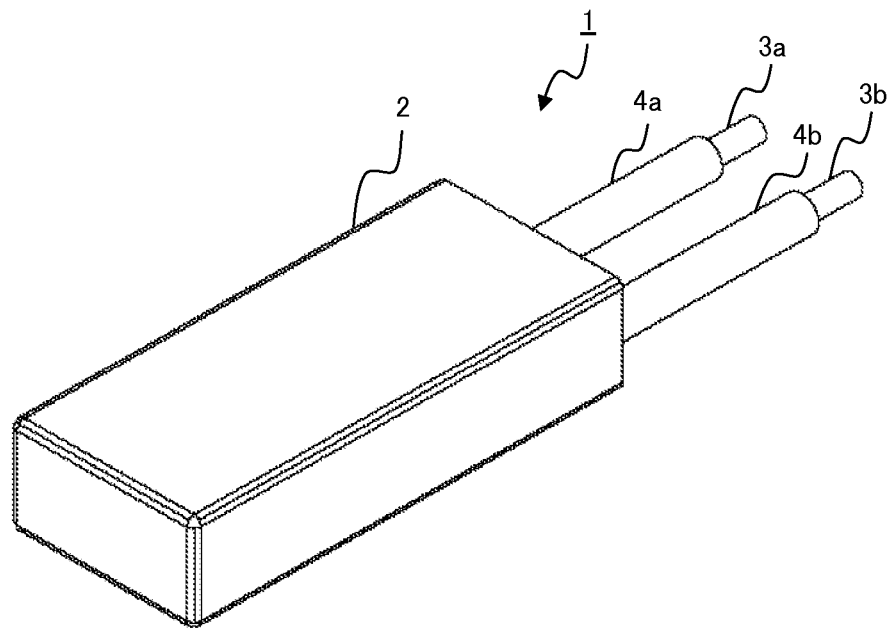
FIG. 1A is an external perspective view of a temperature control element in which the operating temperature is to be accurately detected by a temperature sensor according to first to fourth embodiments of the present invention.

EXPLANATION OF CODES 1 temperature control element
2 housing
3(3a, 3b) lead wire
4(4a, 4b) insulative coating material
5 thermostat
6 bimetal
7 movable plate
8 hook
9 upper support member
11 lower support member
12 penetration hole
13 column
14 thermal conductive member
15 fixed plate
15a one end
16 fixed contact
20, 20-1, 20-2, 20-3, 20-4 temperature sensor
21 housing
22(22a, 22b, 22c) lead wire
22a-1, 22b-1, 22c-1 connection end
23(23a, 23b, 23c) insulative coating material
24 top surface
24a upper internal surface
25 bottom surface
25a lower internal surface
26 left side surface
27 right side surface
28 small side surface
29 opening part
31 print substrate
32 temperature detection element
33 lead
34 print wire for a connection
35(35a, 35b, 35c) print wire for an input and output
36 connection electrode
37 a connection inlet
38 solder 39 fixed member
41 hardened resin
42 space part
43 penetration hole
44 adhesive
45 penetration hole
46 lower fixed member
46a column
47 upper fixed member
48 adhesive
49 penetration hole

BEST MODE FOR CARRYING OUT THE INVENTION

Figure 1B:
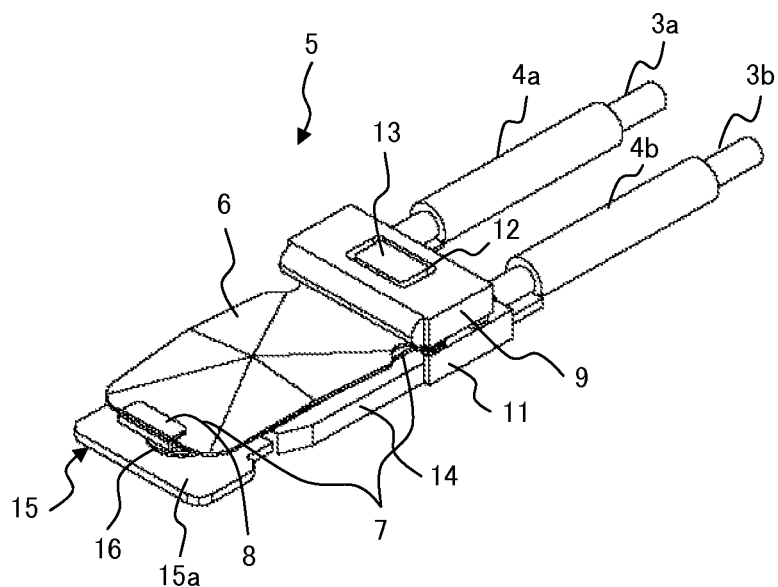
FIG. 1B is a perspective view of an internal configuration accommodated within a housing illustrated in FIG. 1A.

FIG. 1A is an external perspective view of a temperature control element in which the operating temperature is to be accurately detected by a temperature sensor, to be described in detail later, according to first to fourth embodiments of the present invention. FIG. 1B is a perspective view of an internal configuration accommodated within a housing illustrated in FIG. 1A.

As illustrated in FIG. 1A, the temperature control element 1 includes a housing 2 configured with a metal or resinous member, and two lead wires 3(3a, 3b) that are not illustrated in FIG. 1A and that externally extend by penetrating into a sealing agent that seals an opening part of the housing. The entirety of the lead wires 3 are coated by insulative coating materials 4(4a, 4b), excluding both of the ends.

Within the housing 2, a thermostat 5 illustrated in FIG. 1B is accommodated. The thermostat 5 includes a bimetal 6 that inverts, at a specified temperature, a warpage direction in which the bimetal 6 warps convexly in an ordinary state as illustrated in FIG. 1B.

A free end (the end in an obliquely lower left direction in FIG. 1B) of the bimetal 6 is held by a hook 8 that is formed at one end of a movable plate 7, and an end on the opposite side of the bimetal 6 is fixed to a lower support member 11 by being sandwiched by insulative upper support member 9 and lower support member 11 along with the other end of the movable plate 7.

At the center of the upper support member 9, a penetration hole 12 is formed. At the center of the lower support member 11, a column 13 is erected. The column 13 penetrates into a penetration hole, not visible in FIG. 1B, that is formed at another end, of the movable plate 7, and intrudes into the penetration hole 12 of the upper support member 9, so that the members are mutually aligned.

The two lead wires 3 (3a, 3b) externally extend from the upper support member 9 and the lower support member 11 (an obliquely upper right direction in FIG. 1B). For the lower support member 11, a plate-shaped thermal conductive member 14 that extends in a direction opposite to the lead wires 3 and has a specified thermal conductivity is integrally formed.

One end 15a of a fixed plate 15 that is formed in the shape of a claw (not illustrated in FIG. 1B) is placed at a further extending tip of the thermal conductive member 14. At the one end 15a of the fixed plate 15, a fixed contact 16 is formed. The other end of the fixed plate 15 extends up to the lower support member 11 by going around a side surface of the fixed plate member 14, and is connected to the end of the lead wire 3a.

In a position, corresponding to the fixed contact 16 of the fixed plate 15, on a bottom surface of the end of the movable plate 7, a movable contact is formed, although this is not illustrated in FIG. 1B. The movable contact is pressed against the fixed contact in an ordinary state by a biasing force of the bimetal 6. The end sandwiched by the upper support member 9 and the lower support member 11 of the movable plate 7 is connected to the end of the lead wire 3b.

The temperature control element 1 is provided in the neighborhood of a heat generation part of an electric appliance that produces heat, and the lead wires 3a and 3b are connected in series to any of the wires within the electric appliance. When an internal temperature of the electric appliance exceeds a specified temperature, the bimetal 6 inverts the warpage direction upwardly convexly in response to the temperature, so that the fixed contact 16 and the movable contact open to interrupt energization between the lead wires 3a and 3b.

Figure 2:
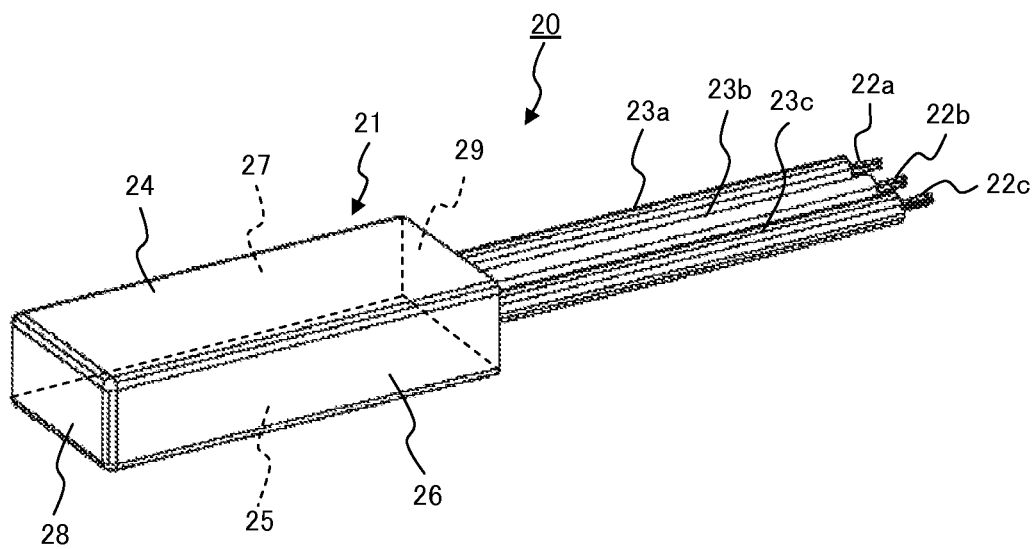
FIG. 2 is an external perspective view of the temperature sensor according to the first to fourth embodiments.

FIG. 2 is an external perspective view of the temperature sensor according to the first to fourth embodiments, to be described in detail later, of the present invention. As illustrated in this figure, a temperature sensor 20 includes a housing 21 made of a metal or a resin, and three lead wires 22 (22a, 22b, 22c) that externally extend from an opening part of the housing 21. The entirety of the lead wires 22 are coated by an insulative coating material 23 (23a, 23b, 23c) except for both ends of the lead wires.

The housing 21 is formed, in the shape of a cuboid, with a wide-area upper surface 24 and lower surface 25 that are vertically opposed, a small-area left-side surface 26 and right-side surface 27 that are opposed right and left, a small side surface 29 that forms one of surfaces that are opposed back and forth, and an opening part 29 formed in a portion that makes contact with the other surface. A size and a material of the housing 21 are configured to be identical to those of the housing 2 of the temperature control element 1.

FIGS. 3A, 3B and 3C are perspective views of the internal configuration, accommodated within the housing 21 of the temperature sensor according to the first and second embodiments. FIG. 3A illustrates the print substrate 31, and the temperature detection element 32 mounted on the print substrate 31. This print substrate 32 has a thickness of 0.8 mm or more.

The temperature detection element 32 is connected to a plurality of print wires 34 for a connection of the print substrate 31 with a plurality of leads 33 that extend from the side surface. Moreover, three print wires 35 (35a, 35b, 35c) for an input and output are provided on the print substrate 31.

The print wire 35a is, for example, a wire for an output from the temperature detection element 32. The print wire 35b is, for example, wired for grounding. The print wire 35c is, for example, a wire for externally inputting a driving control signal. These print wires 35 respectively extend up to outer ends (an obliquely upper right side of FIG. 3A) of the print substrate 31, and connection electrodes 36 are respectively formed at the ends.

In each of the connection electrodes 36, a connection inlet 37 is formed. As illustrated in FIG. 3B, an end 22a-1, an end 22b-1, and an end 22c-1, bent downward, of the lead wires 22 are respectively inserted into the connection inlets 37 of the connection electrodes 36.

Additionally, portions of the end 22a-1, the end 22b-1, and the end 22c-1, bent downward, of the lead wires 22 inserted into the connection inlets 37 of the connection electrodes 36 are fixed by solder 38, and securely connected to the connection electrodes 36, as illustrated in FIG. 3C.

The temperature detection element 32 is an element that converts an ambient temperature into an electric temperature information signal. The temperature detection element 32 incorporates a control circuit, and externally transmits the electric temperature information signal via the print wires 35a and 35b in accordance with an instruction signal input, for example, from an external host appliance via the print wires 35b and 35c.

At this time, the temperature detection element 32 outputs the electric temperature information signal as an analog signal when the externally input instruction indicates an analog output, or outputs the electric temperature information signal as a digital signal when the externally input instruction indicates a digital output.

First Embodiment

FIG. 4A illustrates the configuration illustrated in FIG. 3C when viewed from the back side in the first embodiment. FIG. 4B is a side-sectional view of a finished piece in which the internal configuration illustrated in FIG. 4A is accommodated within the housing 21. An external appearance of the temperature sensor 20-1 according to the first embodiment is the same as that illustrated in FIG. 2.

In FIGS. 4A and 4B, the same components as those illustrated in FIG. 2 or FIGS. 3A, 3B and 3C are denoted with the same reference numerals as those of FIG. 2 or FIGS. 3A, 3B and 3C. As illustrated in FIG. 4B, the side of an end closer to the opening part 29 is pressed from above by the fixed member 39, and fixed to the lower internal surface 25a of the housing 21, in the print substrate 31.

Additionally, the print substrate 31 is placed so that the entire lower surface, which is a surface on the side opposite to the upper surface on which the temperature detection element 32 is connected, can make close contact with an lower internal surface 25a of the housing 21. Moreover, a space from the opening part 29 to the fixed member 39 is filled with a hardened resin 41. The hardened resin 41 is a resin into which a filled liquid resin is hardened.

The hardened resin 41 externally seals the opening part 29, and also seals the connection parts 22a-1, 22b-1 and 22c-1 with the connection electrodes 36 (also see FIGS. 3A, 3B and 3C) of the lead wires 22 connected to the connection electrodes 36, and the lead-wire covered parts 23a, 23b and 23c on the side of the connection parts.

The side of the other end of the lead wires 22 in which the one end is connected to the connection electrodes 36 is drawn out of the housing 21 by penetrating into the hardened resin 41. Moreover, between five surrounding surfaces not including the surface connected to the print substrate 31 of the temperature detection element 32 and the inner side of the housing 21, a space part 42 is formed.

A placement of the temperature detection element 32 within the housing 21 of the above described temperature sensor 20-1 is that for approximating, as much as possible, the placement of the bimetal 6, illustrated in FIG. 1B, within the housing 2 of the temperature control element 1 illustrated in FIG. 1A.

As described above, a difference between thermal capacities of the temperature control element 1 and the temperature sensor 20-1 is reduced to a minimum by making the size and the material of the housing 2 of the temperature control element 1 identical to those of the housing 21 of the temperature sensor 20-1.

The difference between the thermal capacities of both the temperature control element 1 and the temperature sensor 20-1 are reduced to a minimum, and the placement of the bimetal 6 is approximated to that of the temperature detection element 32 as described above, whereby a difference between thermal sensitive positions of the bimetal 6 and the temperature detection element 32 is reduced to a minimum.

As described above, a difference between thermal capacities and that between thermal sensitive positions are reduced to a minimum, whereby a difference caused between thermal responses of the temperature control element 1 and the temperature sensor 20-1 is reduced to a minimum. In other words, the temperature sensor having a thermal characteristic equal to that of the temperature control element is realized.

Thus, when the temperature sensor 20-1 is placed close to the temperature control element 1 within an electric appliance in order to enable a test of measuring or setting the operating temperature of the temperature control element 1, a temperature at which the temperature control element 1 operates and that indicated by the electric temperature information signal output from the temperature sensor 20-1 precisely match.

Note that a heat produced by a current that flows within the temperature control element, namely, Joule heat produced within the housing, normally causes a difference between the operating temperature in a case where a current does not flow within the temperature control element and that in a case where a current flows within the temperature control element when being mounted. This difference is digital information based on standard data.

In the meantime, Joule heat is not produced because a current does not flow within the housing in the temperature sensor. Accordingly, an ambient temperature can be accurately measured. Therefore, when an output of the temperature sensor is a digital signal, the degree of a change in the operating temperature caused by Joule heat produced by an energized current of the temperature control element can be grasped on the side of a controller that receives the output of the temperature sensor.

If the degree of a change in the operating temperature caused by Joule heat produced by the energized current of the temperature control element can be grasped, data of an actual operating temperature at which the temperature control element operates can be corrected. Moreover, the temperature control element can be simulated by operating the electric appliance when the temperature sensor is incorporated along with the temperature control element.

Additionally, such a simulation facilitates a verification of determining whether a temperature of the temperature control element is properly set in accordance with a normal operating range in incorporated various appliances, and an abnormal operating condition exceeding this normal operating range.

Conventionally, isotropy is important for a thermal conductivity of a normal temperature sensor, and it is also desirable to minimize the temperature sensor terms of a thermal capacity. In the meantime, a bimetal, which is a temperature sensitive element, is incorporated into a normal temperature control element, being one-sided on a surface within a housing, and the bimetal and a switch mechanism are included as described above, so that the thermal capacity increases and thermo-sensitive anisotropy is present.

When such a temperature control element is simulated, a thermal characteristic equal to that of the temperature control element is demanded for the temperature sensor. By using the temperature sensor according to the embodiments of the present invention, both the thermal capacity and the temperature-sensitive position of the temperature sensor become equal to those of the temperature control element, whereby the thermal characteristic also becomes equal.

If a microprocessor is included on the side of an electric appliance such as a so-called digital home electric appliance when temperature data is directly output from the temperature sensor, condition settings and a verification in a case where protection is performed with a mechanism switch as a fail-safe become very easy. As a result, final safety is also improved.

Second Embodiment

Figure 5A:
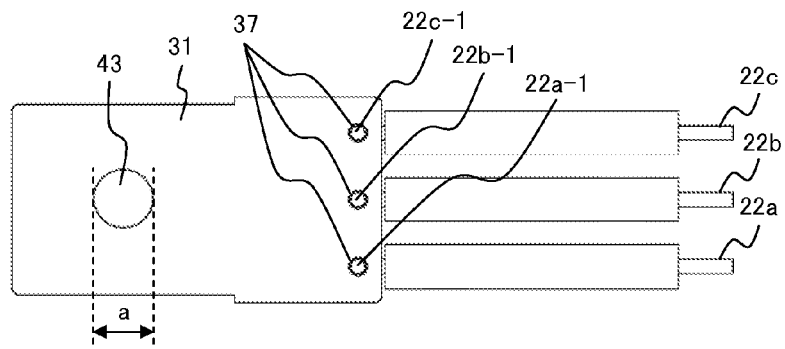
FIG. 5A illustrates the internal configuration of the temperature sensor according to the second embodiment when viewed from a back side.
Figure 5B:
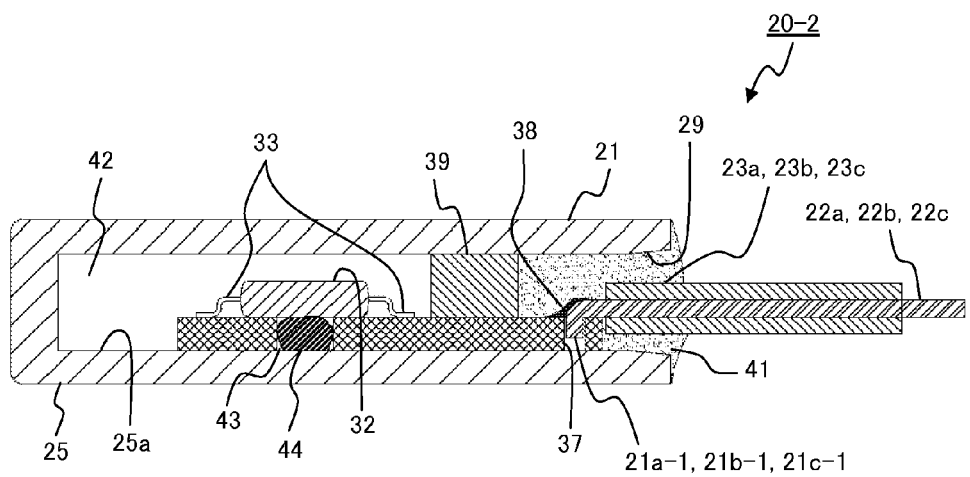
FIG. 5B is a side-sectional view of a finished piece in which the internal configuration illustrated in FIG. 5A is accommodated within the housing.

FIG. 5A illustrates an internal configuration of the temperature sensor according to the second embodiment when viewed from a back side. FIG. 5B is a side-sectional view of a finished piece in which the internal configuration illustrated in FIG. 5A is accommodated within a housing. In FIGS. 5A and 5B, the same components as those illustrated in FIG. 2 or 4 are denoted with the same reference numerals illustrated in FIG. 2 or 4.

Additionally, FIG. 5A illustrates a state where a penetration hole 43 having a size of a diameter a for a vertical penetration is formed in a portion corresponding to the center of the temperature detection element 32 illustrated in FIG. 4A of the print substrate 31. In this embodiment, the penetration hole 43 is filled with an adhesive 44 having a specified thermal conductivity.

An external appearance of the temperature sensor 20-2 according to the second embodiment is the same as that illustrated in FIG. 2. Note that operations, functions and effects of the temperature sensor 20-2 are the same as those of the temperature sensor 20-1 illustrated in FIG. 4.

In this embodiment, however, a detection temperature can be varied in advance. Namely, the size (the size of the diameter a) of the penetration hole 43 and the thermal conductivity of the adhesive 44 are selected before an assembly of the temperature sensor is complete, so that the detection temperature of the temperature sensor 20-2 can be preset to a desired detection temperature.

Thus, the detection temperature of the temperature sensor 20-2 can be set in accordance with a temperature to be measured of an ambient environment of the housing 21 of the temperature sensor 20-2. A relational expression between the size (the diameter a) of the penetration hole 43, the thermal conductivity of the adhesive 44, and the detection temperature is created on the basis of results of a plurality of experiments, and the detection temperature can be set on the basis of this relational expression.

Third Embodiment

FIG. 6A illustrates an internal configuration of the temperature sensor according to the third embodiment when viewed from a top side. FIG. 6B illustrates the internal configuration illustrated in FIG. 6A when viewed from a back side. FIG. 6C is a top view of an inside implemented by removing the wide-area top surface 24, illustrated in FIG. 2, of the housing after the internal configuration is accommodated within the housing. FIG. 6D is a side-sectional view of a finished piece in which the upper surface 24 is attached.

In FIGS. 6A to 6D, the same components as those illustrated in FIG. 2 or 5 are denoted with the same reference numerals illustrated in FIG. 2 or 5. Moreover, the print substrate 31 is denoted with the same reference numerals as those illustrated in FIG. 3 or 5 in this embodiment. However, the print substrate 31 is configured with a substrate having a thickness equal to or less than 0.1 mm.

Additionally, in this embodiment, a penetration hole 45 for a column is formed between the temperature detection element 32 and the connection electrodes 26. Therefore, the print wire 35b for a ground among the print wires 35 for an input and output is provided by being significantly bent to avoid the penetration hole 45.

When the above described internal configuration is accommodated within the housing 21 as illustrated in FIGS. 6C and 6D, a bottom surface, which is a side surface opposite to the top surface to which the temperature detection element 32 is connected, is supported by the lower fixed member 46.

In the lower fixed member 46, a column 46a is erectly provided at a position corresponding to the penetration hole 45 of the print substrate 31. A top surface of the column 46a makes contact with the internal upper surface 24a of the housing 21 by penetrating into the penetration hole 45, so that the print substrate 31 is aligned.

Furthermore, the side of the end closer to the opening part 29 of the housing 21 of the print substrate 31 is pressed from above by the upper fixed member 47, and fixed to the lower internal surface 25a of the housing 21 along with the lower fixed member 46. The upper fixed member 47 is placed by externally fitting it into the column 46a, and presses down the end closer to the opening part 29 of the print substrate 31.

The above described lower fixed member 46 is placed so that the entire lower surface, which is a side surface opposite to the upper surface that supports the print substrate 31, can make close contact with the lower internal surface 25a. Moreover, in this embodiment, an adhesive 48 having a specified area and thickness is interposed between the lower fixed member 46 and the bottom surface of the print substrate 31.

Also in this embodiment, a space ranging from the opening part 29 to the upper fixed member 47 and the lower fixed member 46 is filled with the hardened resin 41. The hardened resin 41 externally seals a connection part with the connection electrodes 36 by the solder 38 of the lead wires 22 connected to the connection electrodes 36, and the insulative coating materials 23 that form the lead-wire covered parts on the side of the connection part.

Additionally, also in this embodiment, the side of the other end of the lead wires 22 in which one end is connected to the connection electrodes 36 is drawn out of the housing 21 by penetrating into the hardened resin 41. Moreover, a space part 42 is formed between the five surrounding surfaces not including the surface connected to the print substrate 31 of the temperature detection element 32 and the inner surface of the housing 21.

Also in this embodiment, a placement of the temperature detection element 32 within the housing 21 of the above described temperature sensor 20-3 approximates, as much as possible, the placement of the bimetal 6 illustrated in FIG. 1B within the housing 2 of the temperature control element 1 illustrated in FIG. 1A.

Note that an external appearance of the temperature sensor 20-3 according to the third embodiment is the same as that illustrated in FIG. 2. Operations, functions and effects of the temperature sensor 20-3 are the same as those of the temperature sensor 20-2 illustrated in FIG. 5.

Also in this embodiment, the detection temperature can be varied. In this embodiment, it is difficult to change a thermal conductivity of the lower fixed member 46 because a material of the comparatively large member is changed. However, it is easy to change the adhesive 48 to another adhesive 48 having a different thermal conductivity. It is also easy to change an area in which the adhesive 48 is coated.

The detection temperature of the temperature sensor 20-3 can be preset to a desired detection temperature in accordance with a temperature to be measured of an ambient environment of the housing 21 of the temperature sensor 20-3 by selecting the coated area and the thermal conductivity of the adhesive 44 in advance before an assembly of the temperature sensor is complete.

Fourth Embodiment

Figure 7A:
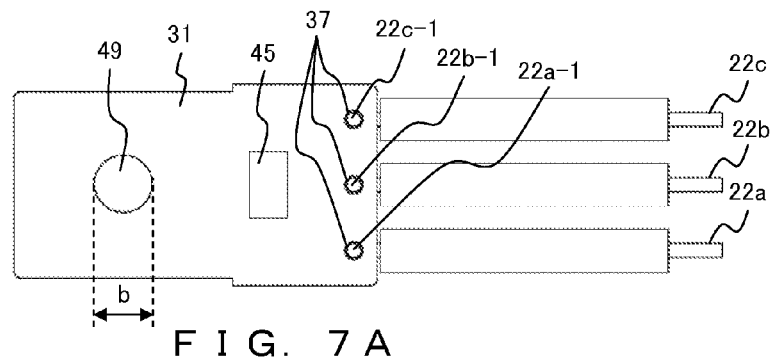
FIG. 7A illustrates the internal configuration of the temperature sensor according to the fourth embodiment when viewed from a back side.
Figure 7B:
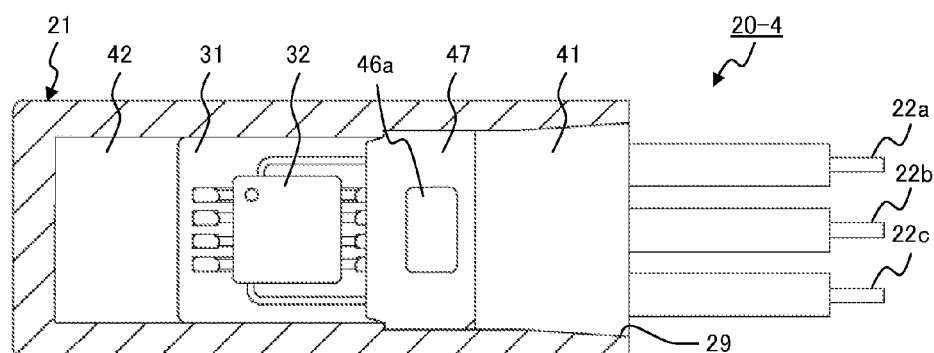
FIG. 7B is a top view of an inside implemented by removing a top surface of the housing after the internal configuration illustrated in FIG. 7A is accommodated within the housing.
Figure 7C:
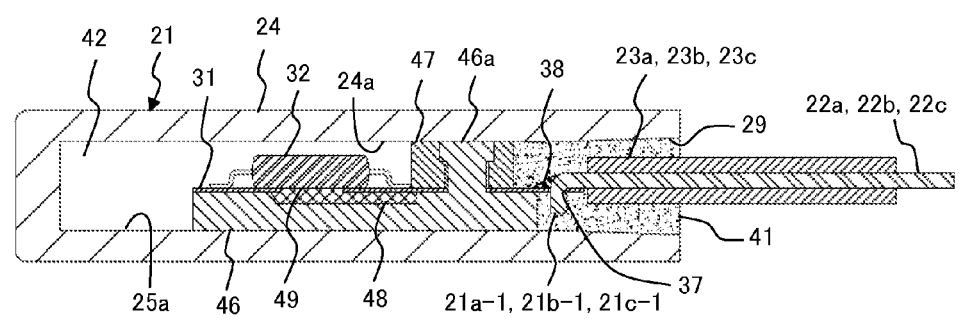
FIG. 7C is a side-sectional view of a finished piece in which the top surface is attached to the configuration illustrated in FIG. 7B.

FIG. 7A illustrates an internal configuration of the temperature sensor according to the fourth embodiment when viewed from a back side. FIG. 7B is a top view of an inside implemented by removing the wide-area upper surface 24 illustrated in FIG. 2 of the housing after the internal configuration is accommodated within the housing. FIG. 7C is a side-sectional view of a finished piece in which the upper surface 24 is attached to the configuration illustrated in FIG. 7B.

In FIGS. 7A to 7C, the same components as those illustrated in FIG. 6 are denoted with the same reference numerals as those of FIG. 6. Also in this embodiment, the print substrate 31 is configured with a substrate having a thickness of 0.1 mm or less.

Additionally, an external appearance of the temperature sensor 20-4 according to the fourth embodiment is the same as that illustrated in FIG. 2. Moreover, operations, functions and effects of the temperature sensor 20-4 are the same as those of the temperature sensor 20-3 illustrated in FIG. 6.

However, the temperature sensor according to this embodiment is different from that illustrated in FIG. 6 in that a penetration hole 49 in which a size of a vertical penetration is a diameter b is formed in a portion, corresponding to the center of the temperature detection element 32, of the print substrate 31, and in that the adhesive 48 is directly bonded to the bottom surface of the temperature detection element 32 via the penetration hole 49.

In the case of FIG. 6, the heat of the adhesive 48 in which the thermal conductivity is changed is conducted to the bottom surface of the temperature detection element 32 via the print substrate 31. In this embodiment, however, the adhesive 48 is directly bonded to the bottom surface of the temperature detection element 32 via the penetration hole 49. Therefore, the heat of the adhesive 48 in which the thermal conductivity is changed can be directly conducted to the bottom surface of the temperature detection element 32.

As described above, the coated area and the thermal conductivity of the adhesive 44 are selected in advance before an assembly of the temperature sensor is complete, whereby the detection temperature of the temperature sensor 20-4 can be preset to a desired detection temperature in accordance with a temperature to be measured of an ambient environment of the housing 21 of the temperature sensor 20-4.

The above explanation has referred to the case where both the housing of the temperature control element and that of the temperature sensor are rectangular parallelepiped. Needless to say, the configuration is not limited to this as long as the external shape and the material of the housing of the temperature sensor are configured by being approximated to those of the housing of the temperature control element.

For example, some temperature control elements have a cylindrical housing. In this case, the housing of a temperature sensor may also be formed cylindrically. Then, the print substrate 31 is pressed from the back surface by a pressing member provided within the housing, and the temperature detection element 32 mounted on the print substrate 31 is incorporated by being pressed against an inner surface of a metal cap of the cylindrical housing.

The connection electrodes and the external connection terminals of the print substrate 31 are connected with wires formed by being bent to be deformable within the housing. The metal cap is implemented as a heat-sensitive member, and the temperature sensor is installed by causing an outer surface of the metal cap to make contact with a surface that is needed to be heat-sensed.

INDUSTRIAL APPLICABILITY

As described above, the temperature sensor according to the present invention is applicable in all industries that demand a temperature sensor for accurately detecting an operating temperature of a temperature control element such as a thermostat.

The invention claimed is:
1. A temperature sensor, comprising:
a temperature detection element that converts an ambient temperature into an electric temperature information signal;
a housing, made of a metal or a resin, having a small side surface that forms one of remaining opposed small-area surfaces of a cuboid formed with opposed wide-area upper and lower surfaces and right and left opposed small-area side surfaces, and an opening part present in a portion opposed to the small side surface;
a print substrate in which the temperature detection element is connected to print wires, a plurality of input and output terminals of the temperature detection element are respectively connected to input and output print wires, and connection electrodes are respectively formed at ends of the input and output print wires, within the housing;
lead wires in which one end is connected to the connection electrodes and the other end is drawn out of the housing;
a fixed member that fixes a side of an end closer to the opening part of the print substrate to the wide-area lower surface of the housing by pressing from above the side of the end;
a hardened resin with which a space from the opening part to the fixed member is filled and which seals a connection part with the connection electrodes of the lead wires connected to the connection electrodes, and lead wire covered parts on a side of the connection part; and
a space part formed between five surrounding surfaces not including a surface connected to the print substrate of the temperature detection element and an inner surface of the housing, wherein
the print substrate is placed so that an entire lower surface, which is a side surface opposite to an upper surface to which the temperature detection element is connected, makes contact with the wide-area lower surface of the housing.
2. The temperature sensor according to claim 1, wherein the print substrate has a thickness of 0.8 mm or more.
3. The temperature sensor according to claim 1, wherein a penetration hole of a specified size for a vertical penetration is formed in a position corresponding to a center of the temperature detection element, and an adhesive having a specified thermal conductivity with which the penetration hole between the lower surface of the temperature detection element and a bottom surface of the housing is filled, in the print substrate.

4. The temperature sensor according to claim 3, wherein a size of the penetration hole, and the thermal conductivity are preset in accordance with a temperature to be measured of an ambient environment of the housing.

5. The temperature sensor according to claim 1, wherein the temperature detection element converts a detected temperature into a resistance value or a voltage value, and transmits, to the lead wire, the converted resistance value or voltage value as an analog signal.

6. The temperature sensor according to claim 1, wherein the temperature detection element converts the detected temperature into a resistance value or a voltage value, and transmits, to the lead wire, the converted resistance value or voltage value as a digital signal.

7. The temperature sensor according to claim 1, wherein the housing is configured with a same material and size as a housing of a temperature control element in which an operating temperature is to be measured by the temperature sensor, and the temperature detection element is provided within the housing of the temperature sensor in a same placement as a placement of a temperature responsive element within the housing of the temperature control element.

8. A temperature sensor, comprising:

a temperature detection element that converts an ambient temperature into an electric temperature information signal;

a housing, made of a metal or a resin, having a small side surface that forms one of remaining opposed small-area surfaces of a cuboid formed with opposed wide-area upper and lower surfaces, and right and left opposed small-area side surfaces, and an opening part present in a portion opposed to the small side surface;

a print substrate in which the temperature detection element is connected to print wires, a plurality of input and output terminals of the temperature detection element are respectively connected to input and output print wires, connection electrodes are respectively formed at ends of the input and output print wires, and a penetration hole is formed between the connection electrodes and the temperature detection element, within the housing;

lead wires in which one end is connected to the connection electrodes and the other end is drawn out of the housing;

a lower fixed member, provided with a column that penetrates into the penetration hole of the print substrate, the lower fixed member aligning the print substrate with the column, and supporting a lower surface, which is a side surface opposite to an upper surface to which the temperature detection element of the print substrate is connected;

an adhesive that has a specified area and thickness and is interposed between the lower fixed member and a surface supported by the lower fixed member of the print substrate;

an upper fixed member, externally fit into the column, the upper fixed member fixing, along with the lower fixed member, the print substrate by pressing from above the side of an end closer to the opening part of the print substrate;

a hardened resin with which a space from the opening part to the upper fixed member and the lower fixed member is filled and which seals a connection part with the connection electrodes of the lead wires connected to the connection electrodes, and lead wire covered parts on a side of the connection part; and a space part formed between five surrounding surfaces not including a surface connected to the print substrate of the temperature detection element and an inner surface of the housing, wherein the lower fixed member is placed so that an entire lower surface, which is a side surface opposite to an upper surface that supports the print substrate, makes contact with the wide-area lower surface of the housing.

9. The temperature sensor according to claim 8, wherein the print substrate has a thickness of 0.1 mm or less and of greater than 0 mm.

10. The temperature sensor according to claim 8, wherein a penetration hole of a specified size for a vertical penetration is formed in a position corresponding to a center of the temperature detection element, the penetration hole is filled with the adhesive, and the adhesive corresponding to the penetration hole is piled up, in the print substrate.

* * * * *